(12) United States Patent
Ouyang

(10) Patent No.: US 12,174,836 B1
(45) Date of Patent: Dec. 24, 2024

(54) EFFICIENTLY AUTHORIZING PARAMETERIZED DATABASE QUERY VIEWS

(71) Applicant: SAP SE, Walldorf (DE)

(72) Inventor: Yinghua Ouyang, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/496,449

(22) Filed: Oct. 27, 2023

(51) Int. Cl.
  *G06F 16/00* (2019.01)
  *G06F 16/22* (2019.01)
  *G06F 16/2453* (2019.01)
  *G06F 16/2455* (2019.01)

(52) U.S. Cl.
  CPC .... *G06F 16/24553* (2019.01); *G06F 16/2246* (2019.01); *G06F 16/24542* (2019.01)

(58) Field of Classification Search
  None
  See application file for complete search history.

(56) References Cited

U.S. PATENT DOCUMENTS

| | | | |
|---|---|---|---|
| 10,545,984 B2 | 1/2020 | Zhang et al. | |
| 11,494,359 B2 | 11/2022 | Hao et al. | |
| 11,775,521 B2 * | 10/2023 | Ouyang | ............... H04L 67/1095 707/634 |
| 2017/0364555 A1 * | 12/2017 | Sirigireddy | ....... G06F 16/24534 |
| 2018/0121326 A1 * | 5/2018 | Qi | ........................ G06F 11/3636 |
| 2020/0320094 A1 | 10/2020 | Ouyang et al. | |
| 2021/0303576 A1 | 9/2021 | Ouyang et al. | |
| 2023/0063528 A1 * | 3/2023 | Ouyang | .................... G06F 9/54 |
| 2023/0127572 A1 * | 4/2023 | Jacob | .................. G06F 21/6227 707/755 |

OTHER PUBLICATIONS

U.S. Appl. No. 17/983,589, filed Nov. 9, 2022, Ouyang et al.
U.S. Appl. No. 17/985,294, filed Nov. 11, 2022, Ouyang.
U.S. Appl. No. 18/169,271, filed Feb. 15, 2023, Ouyang et al.
U.S. Appl. No. 18/180,221, filed Mar. 8, 2023, Zhang et al.

* cited by examiner

*Primary Examiner* — Anhtai V Tran
(74) *Attorney, Agent, or Firm* — Fish & Richardson P.C.

(57) ABSTRACT

The present disclosure involves systems, software, and computer implemented methods for efficiently authorizing parameterized query views. An example method includes parsing a received query to generate a global query parse tree. In response to determining that the query includes a parameterized query view, the parameterized query view is parsed to generate a view parse tree which is then attached to the global query parse tree. In response to determining that an object in the global query parse tree is a parameterized query view, a view parse tree portion of the global query parse tree is traversed to identify objects associated with the parameterized query view. The parameterized query view and the identified objects are authorized in a single authorization step. For objects in the global query parse tree that are not parameterized query views, the object is authorized. In response to all objects being authorized, the query is executed.

20 Claims, 5 Drawing Sheets

```
304 ─ create table T1(a int);
306 ─ insert into T1 values (1);
308 ─ create view PSV1(in i int) as select a from T1 where a = :i;
302 ─ select a from PSV1(1);   --Querying against parameterized sql view
```
FIG. 3
300
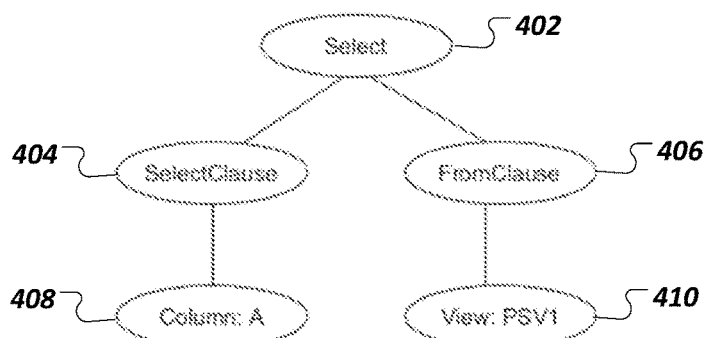
FIG. 4
400
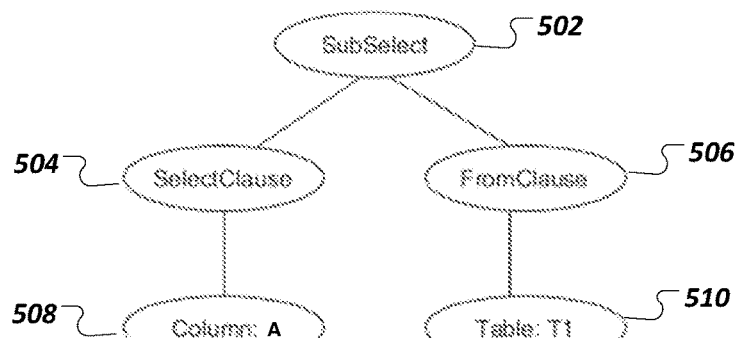
FIG. 5
200

EFFICIENTLY AUTHORIZING PARAMETERIZED DATABASE QUERY VIEWS

TECHNICAL FIELD

The present disclosure relates to computer-implemented methods, software, and systems for efficiently authorizing parameterized database query views.

BACKGROUND

A database system can support use of parameterized queries. A parameterized query enables a client to provide input values for the query at the time the client provides the query to the database system. Parameterized queries can include placeholders for input values, and the database system can insert input values into a parameterized query in place of the placeholders to create an executable query from the parameterized query.

SUMMARY

The present disclosure involves systems, software, and computer implemented methods for efficiently authorizing parameterized database query views. An example method includes: receiving, from a user, a query at a database system; parsing the query to generate a global query parse tree; determining whether the query includes a parameterized query view; in response to determining that the query includes a parameterized query view: parsing the parameterized query view to generate a view parse tree; attaching the view parse tree to the global query parse tree to create an expanded global query parse tree; authorizing each object in the expanded global query parse tree, wherein authorizing objects includes: determining whether a current object in the expanded global query parse tree is a parameterized query view; in response to determining that the current object is a parameterized query view: traversing a view parse tree portion of the expanded global query parse tree to identify objects associated with the parameterized query view; and authorizing, in a single authorization step, the parameterized query view and the identified objects associated with the parameterized query view; and in response to determining that the current object is not a parameterized query view, authorizing the current object; determining that all objects in the global query parse tree have been authorized; generating a query execution plan for the query; executing the query according to the query execution plan to generate a query result set; and providing the query result set to the user in response to the query.

Implementations may include one or more of the following features. The view parse tree can be attached to the global query parse tree at a view node in the global query parse tree that corresponds to the parameterized query view. A type of the view node can be changed from a view type to a table type to indicate that the expanded global query parse tree includes an unfolded version of the parameterized query view. A value for a parameter of the parameterized query view can be received along with the query. Executing the query can include replacing the parameter in the parameterized query view with the value of the parameter before executing the query. The query can be received from a process for which the user is an effective user. The query result set can be provided to the process.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 illustrates example query code.

FIG. 4 illustrates an example global parse tree.

FIG. 5 illustrates an example view parse tree.

DETAILED DESCRIPTION

A database system can support parameterized query (e.g., SQL (Structured Query Language)) views. With a parameterized query view, users can provide inputs to query views in a similar manner as inputs can be provided to procedures or functions. However, when processing a query involving a parameterized query view, a cost of authorization can be substantial, because multiple authorization stages may need to be performed for different catalog objects. For example, a first authorization stage may need to be performed for the parameterized query view itself and a second separate authorization stage may need to be performed for underlying objects of the view after the parameterized query view is unfolded (e.g., where unfolding can occur based on the view definition to transform the view reference with corresponding table references that are included in the view definition). Performing multiple different authorization stages can have a substantial and undesirable effect on query execution performance.

Rather than authorize the parameterized query view and the underlying objects of the view in separate authorization stages, a query engine can, in response to a user query that queries a parameterized query view, unfold the view to enable authorizing the view and the underlying objects in one authorization stage, rather than multiple, different authorization stages. Accordingly, a resource cost of authorizing the user for the user query can be reduced and database performance can be improved because a single authorization stage can be performed using less resources, cost, and overhead than would be incurred with separate authorization stages. Additional details of the solution are described below.

Figure 1:
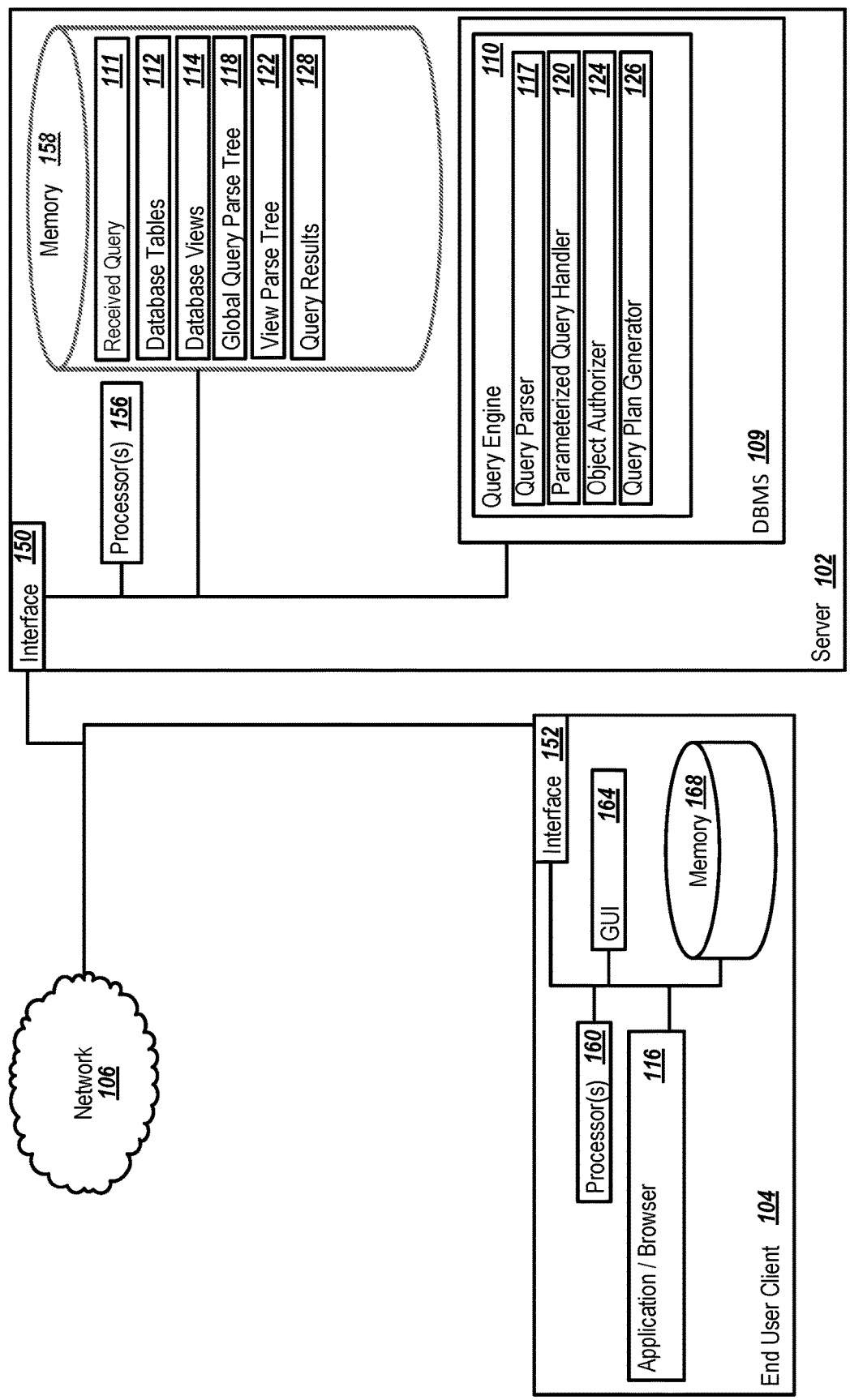
FIG. 1 is a block diagram illustrating an example system for efficiently authorizing parameterized database query views.

FIG. 1 is a block diagram illustrating an example system 100 for efficiently authorizing parameterized database query views. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A server 102 (e.g., a database server) includes a DBMS (Database Management System) 109 that includes a query engine 110. The query engine 110 can process received queries (e.g., a received query 111) against database artifacts such as database tables 112, database views 114, etc. The query engine 110 can process queries based on requests received from an application/browser 116, from internal server processes, or other types of requests. The received query 111 can be associated with a particular user (e.g., a user of the client device 104 or a user associated with a process that submits the received query 111). The user associated with the received query 111 can have different types of authorizations for objects associated with the database tables 112, database views 114, and other database objects.

A query parser 117 can parse the received query 111 to generate a global query parse tree 118. The global query parse tree 118 can be, for example, a graphical representation of the received query 111 in which tree nodes represent operands, operators, and keywords included in the received query 111.

A parameterized query handler 120 can determine if the received query 111 includes a parameterized query (e.g., SQL) view. If the received query 111 includes a parameterized query view, the parameterized query handler 120 can handle parameterized query view aspects of the received query 111, including reducing authorization processing, as described above. For example, the parameterized query handler 120 can unfold a parameterized query view included in the received query 111 to generate a view parse tree 122. The parameterized query handler 120 can attach the view parse tree 122 to the global query parse tree 118 (e.g., to create an expanded global query parse tree).

The parameterized query handler 120 can, along with an object authorizer 124 can authorize objects in the expanded query parse tree 118. When the received query 111 includes a parameterized query view, the parameterized query view and the underlying objects of the view can be authorized by the object authorizer 124 in a single authorization stage. After objects have been authorized, a query plan generator 126 can generate a query plan and the query engine 110 can execute received query 111 according to the query plan, to generate query results 128. The query results can be returned in response to the received query 111, such as to the application/browser 116. Further details of the parameterized query handler 120 are described below with respect to FIGS. 2-7.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application/browser 116. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the application/browser 116. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
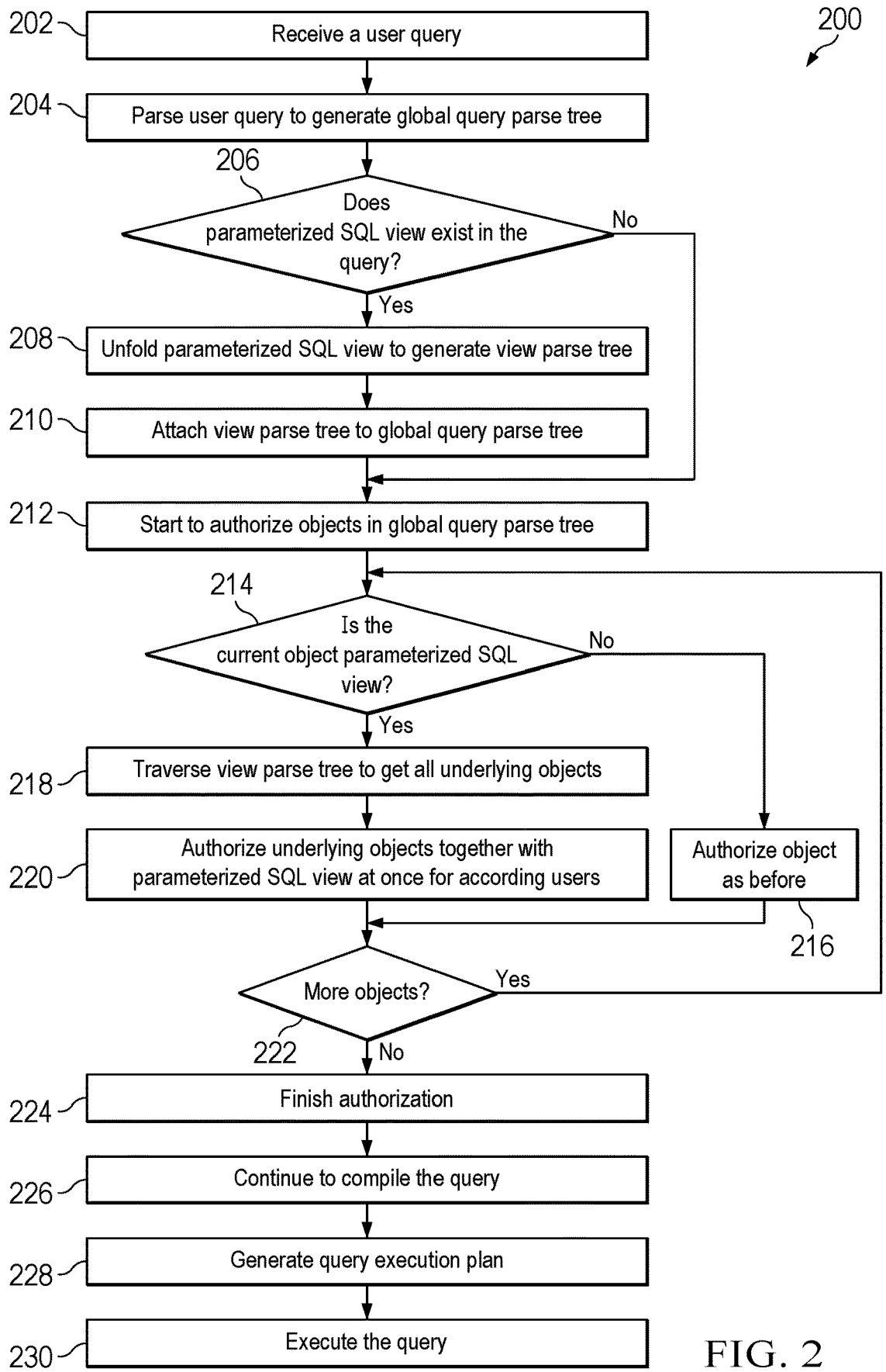
FIG. 2 is a flowchart of an example process.

FIG. 2 is a flowchart of example process 200. The process 200 is described in combination with FIGS. 3, 4, 5, and 6.

At 202, a user query is received. The user query can be a SQL query, for example. For example, and as shown in example query code 300 in FIG. 3, an example query 302 of "select a from PSV(1);" may be received. The example query 302 is based on query code statements 304, 306, and 308. The query code statement 304 can be executed to create a table named T1 that has an integer column named "a". The query code statement 306 can be executed to populate the T1 table with data. The query code statement 308 can be executed to create a parameterized SQL view (PSV) (e.g., a parameterized query view) named PSV1 that is based on the table T1. The parameterized query view is defined as accepting an integer input parameter "i".

At 204 (referring again to FIG. 2), the user query is parsed to generate a global query parse tree. The global parse tree can be a graphical representation of the query in which tree nodes represent operands, operators, and keywords included in the query. The global parse tree created in step 204 can be an initial parse tree that is expanded, as described below.

FIG. 4 illustrates an example global parse tree 400. The global parse tree 400 is a graphical representation of the query 302 of FIG. 3. Node 402 indicates that the query 302 is a select type of query. Nodes 404 and 406 represent the literal "select" and "from" keywords in the query 302, respectively. A node 408 corresponds to the "a" column from which data is to be selected by the query 302 and a node 410 corresponds to the PSV1 view from which data is to be selected.

At 206 (referring again to FIG. 2), a determination is made as to whether a parameterized query view exists in the query. For example and referring again briefly to FIG. 3, a determination can be made that the query 302 includes an invocation (e.g., "PSV1(1)") of the parameterized SQL view PSV1.

At 208, in response to determining that a parameterized query view exists in the query, the parameterized query view is unfolded to generate a view parse tree for the parameterized query view.

FIG. 5 illustrates an example view parse tree 500. The view parse tree 500 corresponds to the parameterized query view defined using the query code statement 308 of FIG. 3 (e.g., "create view PSV1(in i int) as select a from T1 where a=:i;"). A node 502 indicates that the PSV1 view uses a subquery (e.g., a sub-select statement of "select a from T1 where a=:i" included in the query code statement 308). Nodes 504 and 506 represent the literal "select" and "from" keywords in the subquery, respectively. A node 508 corresponds to the "A" column from which data is to be selected by the subquery and a node 510 corresponds to the T1 table from which data is to be selected by the subquery.

At 210 (referring again to FIG. 2), the view parse tree is attached to the global query parse tree.

Figure 6:
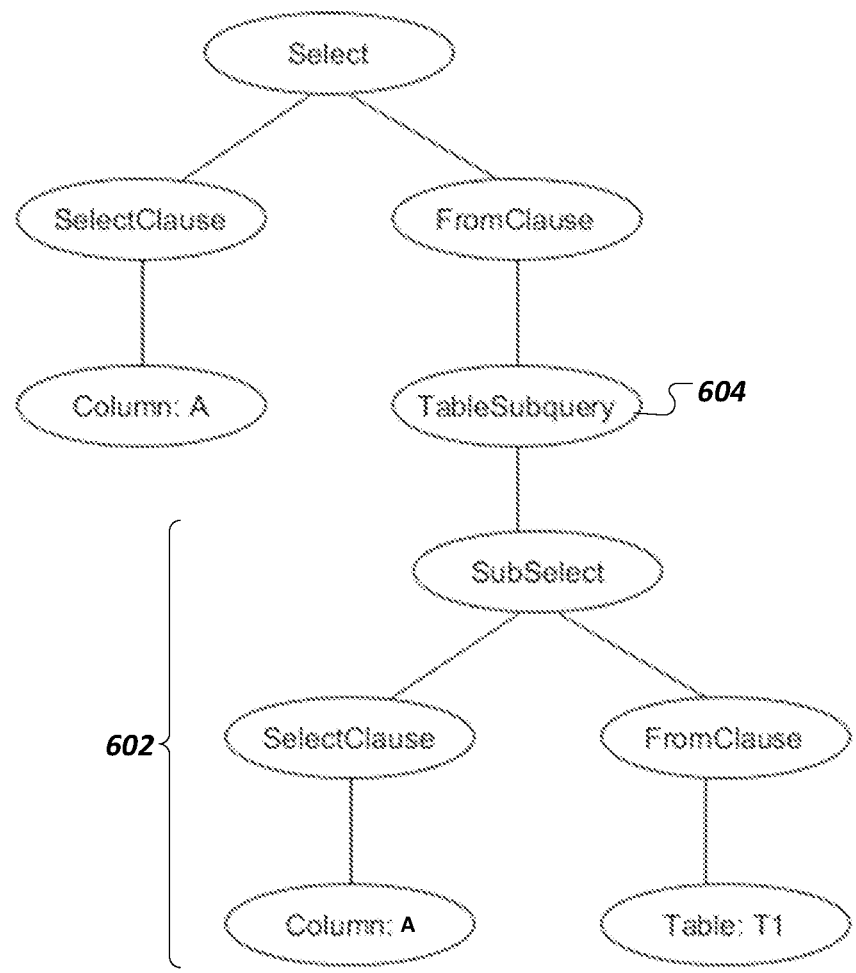
FIG. 6 illustrates an example expanded global parse tree.

FIG. 6 illustrates an example expanded global parse tree 600. The expanded global parse tree 600 includes an appended view parse tree 602 that has been appended to a global parse tree. The appended view parse tree 602 has been appended at a node 604 that corresponds to the node 410 of the global parse tree 400 of FIG. 4. The node 604 now has a type of "TableSubquery" (rather than the view type of the node 410) to indicate that the PSV1 view has been unfolded in the expanded global parse tree 600. That is, the unfolded view is represented in the expanded global parse tree 600 by the appended view parse tree 602.

At 212 (referring again to FIG. 2), either after the view parse tree is attached, or if no parameterized query language exists in the query, an authorization process for objects in the parse tree is initiated.

At 214, a determination is made as to whether a current object is a parameterized query view.

At 216, in response to determining that the current object is not a parameterized query view, a default authorization process is performed for the current object. For example, a determination can be made as to whether the user has authorization for the object. If the user does not have authorization for the object, the process 200 can end. If the user has authorization for the object, the process 200 can continue.

At 218, in response to determining that the current object is a parameterized query view, the view parse tree is traversed to retrieve all underlying objects of the parameterized query view. For example and referring briefly again to FIG. 6, an object associated with the node 604 and objects associated with the appended parse tree 602 are retrieved, in response to determining that the node 604 corresponds to a parameterized query view At 220, underlying objects are authorized along with the parameterized query view for according users. For example, and referring briefly again to FIG. 6, a determination is made as to whether the user is authorized to the retrieved object associated with the node 604 and retrieved objects associated with the appended parse tree 602. If the user does not have authorization for any of these retrieved objects, the process 200 can end. If the user has authorization for all of the retrieved objects, the process 200 can continue.

At 222, a determination is made as to whether there are more objects in the global parse tree to process. If there is at least one unprocessed object, a next object is selected as the current object and processing repeats for the new current object at 214.

At 224, in response to determining that there are no more unprocessed objects in the global parse tree, authorization of objects in the global query parse tree completes.

At 226, processing of the query continues by compiling the query.

At 228, a query execution plan is generated. The query plan can include a sequence of steps to implement execution of the query.

At 230, the query is executed. The query can be executed according to the query plan.

Figure 7:
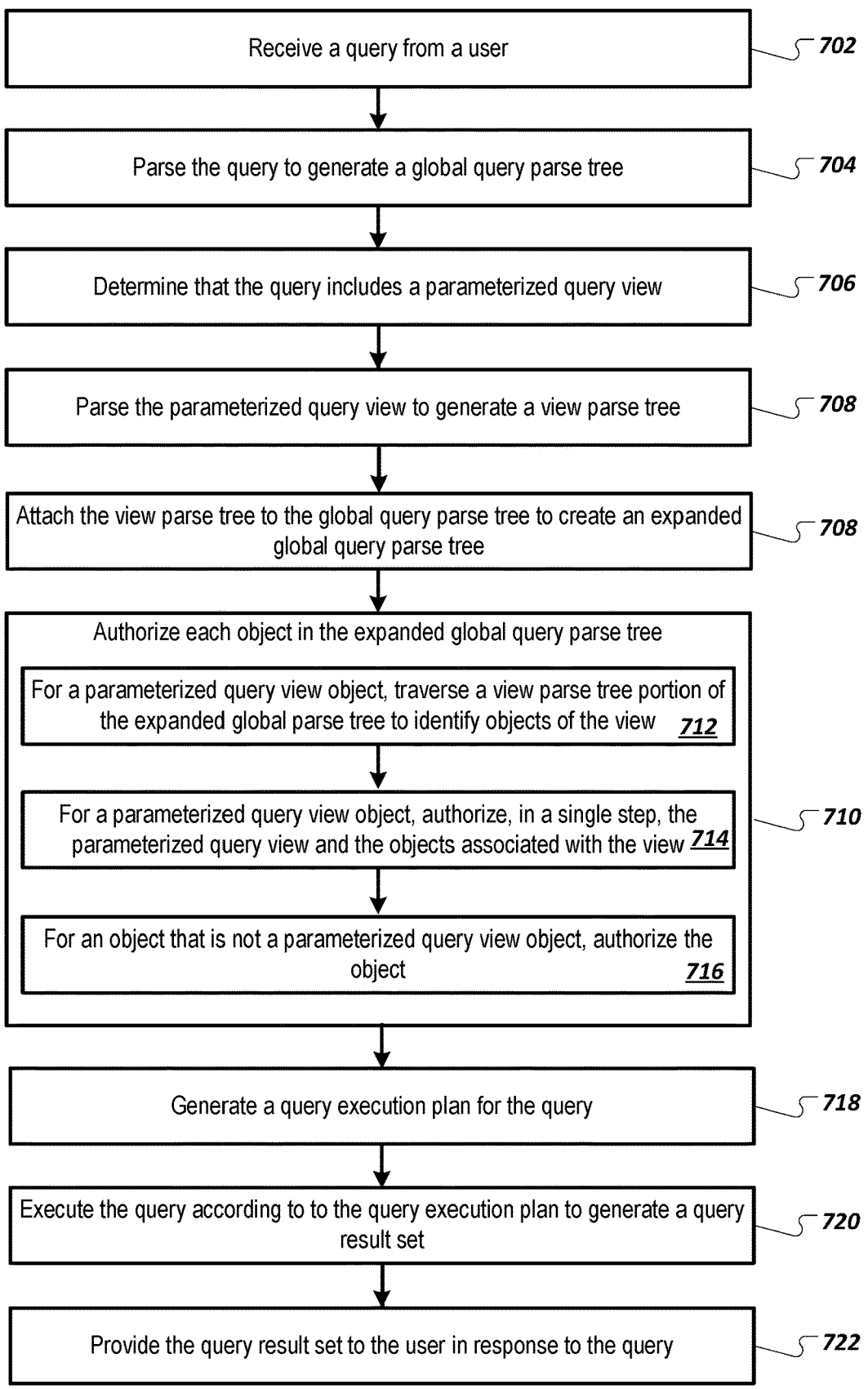
FIG. 7 is a flowchart of an example method for efficiently authorizing parameterized database query views.

FIG. 7 is a flowchart of an example method for efficiently authorizing parameterized database query view. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 700 and related methods can be executed by the query engine 110 of FIG. 1.

At 702, a query is received from a user at a database system. The query can be received from a process for which the user is an effective user.

At 704, the query to generate a global query parse tree.

At 706, a determination is made that the query includes a parameterized query view. A value for a parameter of the parameterized query view can be received along with the query.

At 708, the parameterized query view is parsed to generate a view parse tree.

At 710, the view parse tree is attached to the global query parse tree to create an expanded global query parse tree. The view parse tree can be attached to the global query parse tree at a view node in the global query parse tree that corresponds to the parameterized query view. A type of the view node can be changed from a view type to a table type to indicate that the expanded global query parse tree includes an unfolded version of the parameterized query view.

At 712, each object in the expanded global query parse tree is authorized.

At 714, for example, in response to determining that a current object is a parameterized query view, a view parse tree portion of the expanded global query parse tree is traversed to identify objects associated with the parameterized query view.

At 716, the parameterized query view and the identified objects associated with the parameterized query view are authorized in a single step.

At 718, for an object that is not a parameterized query view, the object is authorized.

At 720, in response to determining that all objects in the global query parse tree have been authorized, a query execution plan is generated for the query.

At 722, the query is executed according to the query execution plan to generate a query result set. Executing the query can include replacing the parameter in the parameterized query view with the value of the parameter before executing the query.

At 724, the query result set is provided to the user in response to the query. The query result set can be provided to a process for which the user is an effective user.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving, from a user, a query at a database system;
parsing the query to generate a global query parse tree;
determining whether the query includes a parameterized query view;
in response to determining that the query includes a parameterized query view:
parsing the parameterized query view to generate a view parse tree;
attaching the view parse tree to the global query parse tree to create an expanded global query parse tree;
authorizing each object in the expanded global query parse tree, wherein authorizing objects includes:
determining whether a current object in the expanded global query parse tree is a parameterized query view;
in response to determining that the current object is a parameterized query view:
traversing a view parse tree portion of the expanded global query parse tree to identify objects associated with the parameterized query view; and
authorizing, in a single authorization step, the parameterized query view and the identified objects associated with the parameterized query view; and
in response to determining that the current object is not a parameterized query view, authorizing the current object;
determining that all objects in the global query parse tree have been authorized;
generating a query execution plan for the query;
executing the query according to the query execution plan to generate a query result set; and
providing the query result set to the user in response to the query.

2. The computer-implemented method of claim 1, wherein the view parse tree is attached to the global query parse tree at a view node in the global query parse tree that corresponds to the parameterized query view.

3. The computer-implemented method of claim 2, wherein a type of the view node is changed from a view type to a table type to indicate that the expanded global query parse tree includes an unfolded version of the parameterized query view.

4. The computer-implemented method of claim 1, wherein a value for a parameter of the parameterized query view is received along with the query.

5. The computer-implemented method of claim 4, wherein executing the query comprises replacing the parameter in the parameterized query view with the value of the parameter before executing the query.

6. The computer-implemented method of claim 1, wherein the query is received from a process for which the user is an effective user.

7. The computer-implemented method of claim 6, wherein the query result set is provided to the process.

8. A system comprising:
one or more computers; and
a computer-readable medium coupled to the one or more computers having instructions stored thereon which, when executed by the one or more computers, cause the one or more computers to perform operations comprising:
receiving, from a user, a query at a database system;
parsing the query to generate a global query parse tree;
determining whether the query includes a parameterized query view;
in response to determining that the query includes a parameterized query view:
parsing the parameterized query view to generate a view parse tree;
attaching the view parse tree to the global query parse tree to create an expanded global query parse tree;
authorizing each object in the expanded global query parse tree, wherein authorizing objects includes:
determining whether a current object in the expanded global query parse tree is a parameterized query view;
in response to determining that the current object is a parameterized query view:
traversing a view parse tree portion of the expanded global query parse tree to identify objects associated with the parameterized query view; and
authorizing, in a single authorization step, the parameterized query view and the identified objects associated with the parameterized query view; and
in response to determining that the current object is not a parameterized query view, authorizing the current object;
determining that all objects in the global query parse tree have been authorized;
generating a query execution plan for the query;
executing the query according to the query execution plan to generate a query result set; and
providing the query result set to the user in response to the query.

9. The system of claim 8, wherein the view parse tree is attached to the global query parse tree at a view node in the global query parse tree that corresponds to the parameterized query view.

10. The system of claim 9, wherein a type of the view node is changed from a view type to a table type to indicate that the expanded global query parse tree includes an unfolded version of the parameterized query view.

11. The system of claim 8, wherein a value for a parameter of the parameterized query view is received along with the query.

12. The system of claim 11, wherein executing the query comprises replacing the parameter in the parameterized query view with the value of the parameter before executing the query.

13. The system of claim 8, wherein the query is received from a process for which the user is an effective user.

14. The system of claim 13, wherein the query result set is provided to the process.

15. A computer program product comprising a non-transitory storage medium, the computer program product encoded with computer readable instructions for causing one or more processors to perform operations comprising:
receiving, from a user, a query at a database system;
parsing the query to generate a global query parse tree;
determining whether the query includes a parameterized query view;
in response to determining that the query includes a parameterized query view:
parsing the parameterized query view to generate a view parse tree;
attaching the view parse tree to the global query parse tree to create an expanded global query parse tree;

authorizing each object in the expanded global query parse tree, wherein authorizing objects includes:
- determining whether a current object in the expanded global query parse tree is a parameterized query view;
- in response to determining that the current object is a parameterized query view: traversing a view parse tree portion of the expanded global query parse tree to identify objects associated with the parameterized query view; and
- authorizing, in a single authorization step, the parameterized query view and the identified objects associated with the parameterized query view; and in response to determining that the current object is not a parameterized query view, authorizing the current object;

determining that all objects in the global query parse tree have been authorized;

generating a query execution plan for the query; executing the query according to the query execution plan to generate a query result set; and providing the query result set to the user in response to the query.

16. The computer program product of claim 15, wherein the view parse tree is attached to the global query parse tree at a view node in the global query parse tree that corresponds to the parameterized query view.

17. The computer program product of claim 16, wherein a type of the view node is changed from a view type to a table type to indicate that the expanded global query parse tree includes an unfolded version of the parameterized query view.

18. The computer program product of claim 15, wherein a value for a parameter of the parameterized query view is received along with the query.

19. The computer program product of claim 18, wherein executing the query comprises replacing the parameter in the parameterized query view with the value of the parameter before executing the query.

20. The computer program product of claim 15, wherein the query is received from a process for which the user is an effective user.

\* \* \* \* \*